US010935976B2

(12) United States Patent
Hashimoto et al.

(10) Patent No.: US 10,935,976 B2
(45) Date of Patent: Mar. 2, 2021

(54) BLINKER JUDGMENT DEVICE AND AUTONOMOUS DRIVING SYSTEM (71) Applicant: Toyota Jidosha Kabushiki Kaisha, Toyota (JP)

(72) Inventors: Ryuta Hashimoto, Susono (JP); Yoshinori Watanabe, Isehara (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 15/931,889

(22) Filed: May 14, 2020

(65) Prior Publication Data
US 2020/0272147 A1 Aug. 27, 2020

Related U.S. Application Data (63) Continuation of application No. 15/826,307, filed on Nov. 29, 2017, now Pat. No. 10,691,125.

(30) Foreign Application Priority Data

Dec. 13, 2016 (JP) .............................. JP2016-241399

(51) Int. Cl.
G05D 1/00 (2006.01)
G06K 9/00 (2006.01)
G08G 1/16 (2006.01)

(52) U.S. Cl.
CPC ....... G05D 1/0088 (2013.01); G06K 9/00825 (2013.01); G08G 1/162 (2013.01); G08G 1/166 (2013.01); G08G 1/167 (2013.01); G05D 2201/0213 (2013.01)

(58) Field of Classification Search
None
See application file for complete search history.

(56) References Cited

U.S. PATENT DOCUMENTS 9,487,139 B1* 11/2016 Ishida ................... B60W 30/08
2004/0016870 A1* 1/2004 Pawlicki ............ G06K 9/00805
250/208.1

FOREIGN PATENT DOCUMENTS

JP 2004-173195 A 6/2004
JP 2010-105502 A 5/2010

* cited by examiner

Primary Examiner — Todd Melton
Assistant Examiner — Jason R Roberson
(74) Attorney, Agent, or Firm — Dinsmore & Shohl LLP (57) ABSTRACT A blinker judgment device mounted on a vehicle includes an information acquisition device configured to acquire surrounding situation information indicating a situation around the vehicle; and a control device configured to: recognize blinker flashing of a target vehicle based on image information of the target vehicle, check, based on the surrounding situation information, whether or not there is a cause for the target vehicle to make a lane change, in response to recognition of the blinker flashing based on the image information, judge that the recognition of the blinker flashing based on the image information is falsely positive in response to determining that the cause does not exist, and devise a travel plan based on the recognition of the blinker flashing in response to determining that the cause exists.

18 Claims, 9 Drawing Sheets

| REASONABLE CAUSE (EVENT EXISTING IN FRONT OF TARGET VEHICLE) | EXPECTED LANE CHANGE DIRECTION |
|---|---|
| LANE INCREASE | DIRECTION TOWARD NEW LANE |
| LANE DECREASE | DIRECTION TOWARD CONTINUING LANE |
| INTERSECTION | LEFT TURN: LEFT DIRECTION, RIGHT TURN: RIGHT DIRECTION |
| LANE BRANCHING | DIRECTION TOWARD BRANCH LANE |
| LANE MERGING | DIRECTION TOWARD MAIN LINE |
| MERGED SECTION | DIRECTION AWAY FROM MERGE LANE |
| FACILITY ENTRANCE | DIRECTION TOWARD FACILITY |
| FACILITY EXIT | DIRECTION AWAY FROM FACILITY |
| LOW-SPEED VEHICLE | DIRECTION ENABLING OVERTAKING |
| OBSTACLE | DIRECTION ENABLING AVOIDING |
| ROADWORK SECTION | DIRECTION ENABLING AVOIDING |
| ACCIDENT VEHICLE | DIRECTION ENABLING AVOIDING |
| TRAFFIC JAM | DIRECTION ENABLING AVOIDING |
| OBJECT LIKELY TO JUMP INTO LANE | DIRECTION ENABLING AVOIDING |

*Fig. 6*

| REASONABLE CAUSE (EVENT EXISTING BEHIND TARGET VEHICLE) | EXPECTED LANE CHANGE DIRECTION |
|---|---|
| LANE INCREASE | DIRECTION TOWARD NEW LANE |
| HIGH-SPEED VEHICLE | DIRECTION ENABLING AVOIDING |
| NEARBY VEHICLE | DIRECTION ENABLING AVOIDING |

Fig. 7

| REASONABLE CAUSE (OTHER CAUSES) | EXPECTED LANE CHANGE DIRECTION |
|---|---|
| TARGET VEHICLE IS IN SPECIFIC LANE (E.G. PASSING LANE, SLOWER TRAFFIC LANE) | DIRECTION TO LEAVE SPECIFIC LANE |
| IMMEDIATELY AFTER TARGET VEHICLE MAKES LANE CHANGE FROM MERGE LANE TO MAIN LINE | DIRECTION AWAY FROM MERGE LANE |
| VEHICLE FLOW IN ADJACENT LANE IS FASTER THAN THAT IN TRAVEL LANE IN WHICH TARGET VEHICLE IS TRAVELING | DIRECTION TOWARD ADJACENT LANE |
| VEHICLE DENSITY IN ADJACENT LANE IS LOWER THAN THAT IN TRAVEL LANE IN WHICH TARGET VEHICLE IS TRAVELING | DIRECTION TOWARD ADJACENT LANE |
| PLURAL SURROUNDING VEHICLES MAKE LANE CHANGES TO SPECIFIC DIRECTION | SPECIFIC DIRECTION |

BLINKER JUDGMENT DEVICE AND AUTONOMOUS DRIVING SYSTEM

CROSS-REFERENCE TO RELATED APPLICATION(S)

This application is a continuation of U.S. application Ser. No. 15/826,307 filed on Nov. 29, 2017, which claims priority to Japanese Patent Application No. 2016-241399 filed on Dec. 13, 2016, the entire contents of which are incorporated herein by reference.

BACKGROUND

Technical Field

The present disclosure relates to a blinker judgment device for judging blinker flashing of another vehicle and an autonomous driving system provided with the blinker judgment device.

Background Art

Conventionally, blinker flashing of another vehicle has been recognized by analyzing images of the other vehicle imaged by a camera (see Patent Literature 1 and Patent Literature 2).

LIST OF RELATED ART

Patent Literature 1: Japanese Laid-Open Patent Publication No. 2004-173195
Patent Literature 2: Japanese Laid-Open Patent Publication No. 2010-105502

SUMMARY

Accuracy of recognition of blinker flashing based on the image analysis is not always high. Therefore, in the case of the conventional technique, there is a possibility that a blinker is erroneously recognized to be flashing although the blinker is not flashing in reality. An object of the present disclosure is to provide a technique that can judge blinker flashing of another vehicle with higher accuracy.

In one embodiments, a blinker judgment device mounted on a vehicle is provided. The blinker judgment device mounted on a vehicle includes an information acquisition device configured to acquire surrounding situation information indicating a situation around the vehicle; and a control device configured to: recognize blinker flashing of a target vehicle based on image information of the target vehicle, check, based on the surrounding situation information, whether or not there is a cause for the target vehicle to make a lane change, in response to recognition of the blinker flashing based on the image information, judge that the recognition of the blinker flashing based on the image information is falsely positive in response to determining that the cause does not exist, and devise a travel plan based on the recognition of the blinker flashing in response to determining that the cause exists.

In another embodiment, an autonomous driving system is provided. The autonomous driving system includes a blinker judgment device mounted on a vehicle. The blinker judgment device includes an information acquisition device configured to acquire surrounding situation information indicating a situation around the vehicle; and a control device configured to: recognize blinker flashing of a target vehicle based on image information of the target vehicle, check, based on the surrounding situation information, whether or not there is a cause for the target vehicle to make a lane change, in response to recognition of the blinker flashing based on the image information, judge that the recognition of the blinker flashing based on the image information is falsely positive in response to the reasonableness check processing determining that the cause does not exist, and devise a travel plan based on the recognition of the blinker flashing in response to determining that the cause exists.

DETAILED DESCRIPTION

Embodiments of the present disclosure will be described below with reference to the attached drawings.

1. Outline

Figure 1:
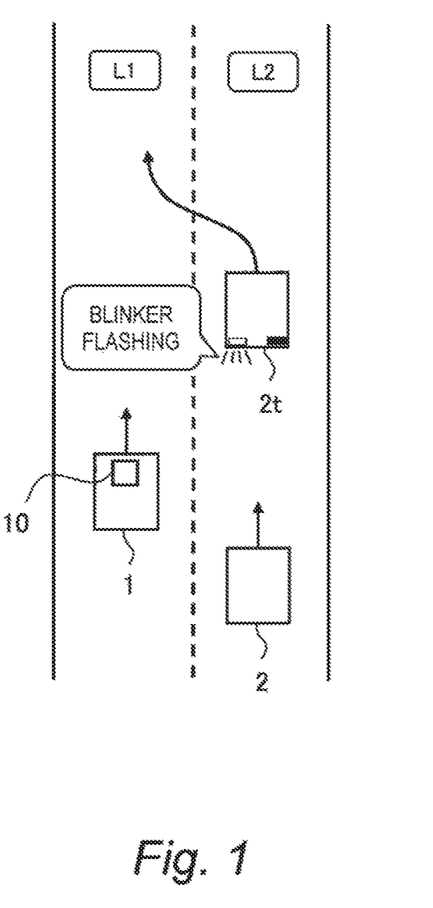
FIG. 1 is a conceptual diagram for explaining an outline of a blinker judgment device according to an embodiment of the present disclosure.

FIG. 1 is a conceptual diagram for explaining an outline of a blinker judgment device 10 according to an embodiment of the present disclosure. The blinker judgment device 10 is mounted on a vehicle 1 and judges blinker flashing of a surrounding vehicle 2 existing around the vehicle 1. The surrounding vehicle 2 as a target of the judgment is hereinafter particularly referred to as a "target vehicle 2t" in order to distinguish it from other surrounding vehicles 2.

The blinker judgment device 10 according to the present embodiment is provided with an information acquisition device that acquires surrounding situation information indicating a situation around the vehicle 1. The information acquisition device includes a camera that takes images of the surroundings. The surrounding situation information includes image information of the surrounding vehicles 2 (including the target vehicle 2t) imaged by the camera. The blinker judgment device 10 is able to recognize blinker flashing of the target vehicle 2t by performing an image analysis of the image information by a well-known method.

However, accuracy of recognition of blinker flashing based on the image analysis of the image information is not always high. Therefore, there is a possibility that a blinker is erroneously recognized to be flashing although the blinker is not flashing in reality.

For example, in FIG. 1, the vehicle 1 is traveling in a lane L1, and the target vehicle 2t is traveling in a lane L2 adjacent to the right side of the lane L1. Let us consider a case where it is recognized by the image analysis of the image information that the target vehicle 2t is flashing a blinker indicating a left direction. The blinker flashing indicating the left direction suggests that the target vehicle 2t will make a lane change from the lane L2 to the lane L1 to cut in front of the vehicle 1. Therefore, a driver or an autonomous driving system utilizing the blinker judgment device 10 decelerates the vehicle 1 in preparation for the lane change of the target vehicle 2t. However, if the recognition of the blinker flashing is false, not only the deceleration results in vain but also the driver feels senses of strangeness and distrust. This leads to decrease in confidence in the blinker judgment device 10.

In view of the above, when the blinker flashing is recognized, the blinker judgment device 10 according to the present embodiment checks whether or not there is any "reasonable cause" for the target vehicle 2t to make a lane change (i.e. the blinker flashing). Here, the lane change means a vehicle operation in an direction away from a current travel lane. What is used in checking existence of a reasonable cause to make a lane change is the above-mentioned surrounding situation information acquired by the information acquisition device. As an example, when the lane L2 ends in front of the target vehicle 2t, it is reasonable that the target vehicle 2t makes a lane change. As another example, when an obstacle exists in front of the target vehicle 2t, it is reasonable that the target vehicle 2t makes a lane change.

When there is any reasonable cause, the blinker judgment device 10 judges that the recognition of the blinker flashing based on the image information is correct. In other words, the blinker judgment device 10 judges that the target vehicle 2t is in a process of the blinker flashing. On the other hand, when there is no reasonable cause, the blinker judgment device 10 judges that the recognition of the blinker flashing based on the image information is incorrect. In other words, the blinker judgment device 10 judges that the target vehicle 2t is not in a process of the blinker flashing.

As described above, the blinker judgment device 10 according to the present embodiment recognizes the blinker flashing of the target vehicle 2t based on the image information imaged by the camera. Furthermore, the blinker judgment device 10 checks, based on the surrounding situation information, whether or not there is any reasonable cause for the target vehicle 2t to make a lane change (i.e. the blinker flashing). Only in the case where the reasonable cause exists, the blinker judgment device 10 judges that the target vehicle 2t is in a process of the blinker flashing. Accordingly, the possibility that the blinker is erroneously recognized to be flashing although the blinker is not flashing in reality decreases. In other words, it is possible to judge the blinker flashing of the target vehicle 2t with higher accuracy. As a result, the driver's confidence in the blinker judgment device 10 increases.

The blinker judgment device 10 according to the present embodiment can be applied to an autonomous driving system, for example. In this case, the autonomous driving system predicts a behavior of the target vehicle 2t based on the result of judgment by the blinker judgment device 10 to control autonomous driving of the vehicle 1. Increase in the accuracy of the blinker judgment means increase in accuracy of prediction of the behavior of the target vehicle 2t. It is thus possible to achieve more safe and highly accurate autonomous driving. This contributes to increase in confidence in the autonomous driving system.

It should be noted that the blinker judgment device 10 according to the present embodiment can be also applied to a system other than the autonomous driving system. For example, the blinker judgment device 10 according to the present embodiment can be used for driving assist, collection of information on behaviors of the surrounding vehicles 2, and so forth.

Hereinafter, the blinker judgment device 10 according to the present embodiment will be described in more detail.

2. Blinker Judgment Device 2-1. Configuration Example

Figure 2:
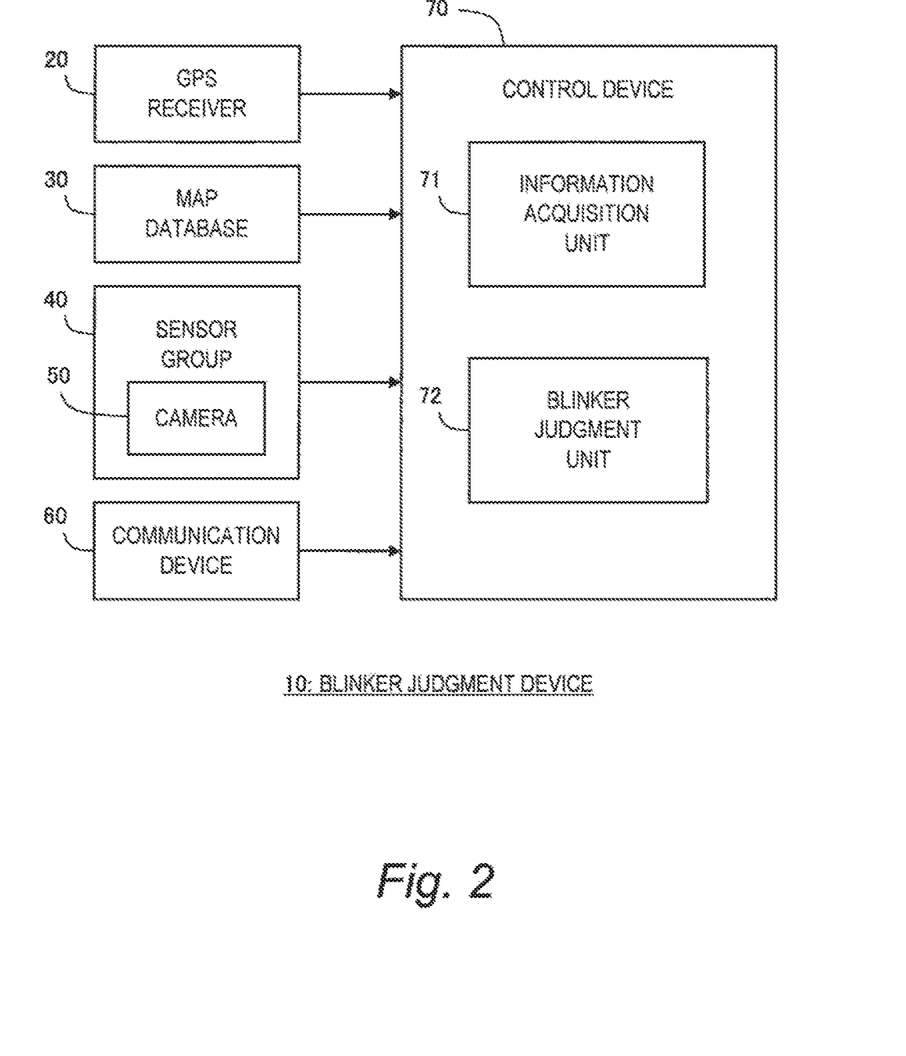
FIG. 2 is a block diagram showing a configuration example of the blinker judgment device according to the embodiment of the present disclosure.

FIG. 2 is a block diagram showing a configuration example of the blinker judgment device 10 according to the present embodiment. The blinker judgment device 10 is provided with a GPS (Global Positioning System) receiver 20, a map database 30, a sensor group 40, a communication device 60, and a control device 70.

The GPS receiver 20 receives signals transmitted from a plurality of GPS satellites and calculates a position and a posture (i.e. orientation) of the vehicle 1 based on the received signals. The GPS receiver 20 sends the calculated information to the control device 70.

Information indicating a boundary position of each lane on a map is beforehand recorded in the map database 30. For example, the boundary position of each lane is represented by a group of plural points or lines. Furthermore, information on facilities along roads may be beforehand recorded in the map database 30. The facilities are exemplified by a parking lot, a gas station, a convenience store, a shopping center, and the like. The map database 30 is stored in a predetermined storage device.

The sensor group 40 detects a situation around the vehicle 1 and a travel state of the vehicle 1. The sensor group 40 includes at least a camera 50 that images a situation around the vehicle 1. Besides, the sensor group 40 is exemplified by a LIDAR (Laser Imaging Detection and Ranging), a radar, a vehicle speed sensor, and the like. The LIDAR uses laser lights to detect a target around the vehicle 1. The radar uses radio waves to detect a target around the vehicle 1. The vehicle speed sensor detects a speed of the vehicle 1. The sensor group 40 sends the detected information to the control device 70.

The communication device 60 performs a V2X communication (i.e. a vehicle-to-vehicle communication and a vehicle-to-infrastructure communication). More specifically, the communication device 60 performs a V2V communication (a vehicle-to-vehicle communication) with the surrounding vehicle 2. In addition, the communication device 60 performs a V2I communication (a vehicle-to-infrastructure communication) with a surrounding infrastructure. Through the V2X communication, the communication device 60 can acquire information on a situation around the vehicle 1. The communication device 60 sends the acquired information to the control device 70.

The control device 70 controls driving of the vehicle 1. Typically, the control device 70 is a microcomputer including a processor, a memory, and an input/output interface. The control device 70 is also called an ECU (Electronic Control Unit). The control device 70 receives a variety of information through the input/output interface. The control device 70 performs driving control of the vehicle 1 based on the received information.

In particular, the control device 70 according to the present embodiment performs "blinker judgment processing" that judges blinker flashing of the surrounding vehicle 2 (i.e. the target vehicle 2t). The control device 70 includes an information acquisition unit 71 and a blinker judgment unit 72 as functional blocks relating to the blinker judgment processing. These functional blocks are achieved by the processor of the control device 70 executing a control program stored in the memory. The control program may be recorded on a computer-readable recording medium.

Hereinafter, respective functions of the information acquisition unit 71 and the blinker judgment unit 72 in the present embodiment will be described in detail.

2-2. Information Acquisition Processing

Figure 3:
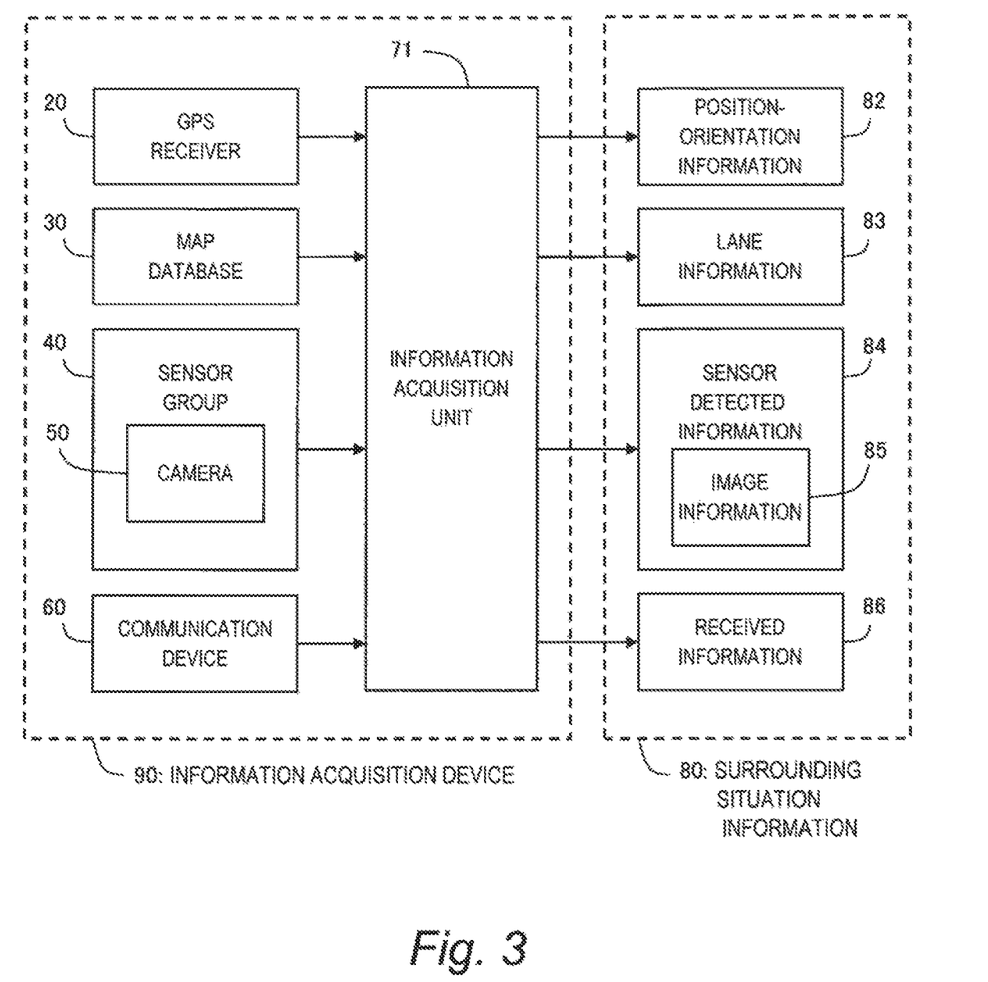
FIG. 3 is a block diagram for explaining functions of an information acquisition unit of the blinker judgment device according to the embodiment of the present disclosure.

FIG. 3 is a block diagram for explaining functions of the information acquisition unit 71 of the control device 70. The information acquisition unit 71 performs "information acquisition processing" that acquires information necessary for the blinker judgment processing. The information acquisition processing is repeatedly executed every certain cycle.

More specifically, the information acquisition unit 71 acquires, from the GPS receiver 20, position-orientation information 82 indicating a current position and a posture (i.e. orientation) of the vehicle 1.

Moreover, the information acquisition unit 71 reads the information regarding lanes from the map database 30 to generate lane information 83. The lane information 83 includes a geometry (i.e. position, shape, and orientation) of each lane on a map. Therefore, it is possible to recognize an intersection, lane increase/decrease, lane merging, lane branching, and the like based on the lane information 83. When the information on facilities along roads is recorded in the map database 30, the lane information 83 may include the information on the facilities.

Moreover, the information acquisition unit 71 generates sensor detected information 84 based on the information detected by the sensor group 40. For example, the sensor detected information 84 includes the vehicle speed detected by the vehicle speed sensor. In addition, the sensor detected information 84 includes target information regarding the target around the vehicle 1. The target around the vehicle 1 includes a moving target and a stationary target. The moving target is exemplified by the surrounding vehicle 2 (see FIG. 1), a motorbike, a bicycle, a pedestrian, and so forth. Information regarding a moving target includes a position, a speed, and a size of the moving target. The stationary target is exemplified by a traffic sign (road sign), a white line, a traffic signal, a fallen object, a roadside structure, and the like. Information regarding a stationary target includes a position and a size of the stationary target. Such the target information is generated by a well-known recognition technique based on the detected information obtained by the sensor group 40 (e.g. the camera 50, the LIDAR, the radar, and the like).

Furthermore, the sensor detected information 84 includes image information 85 imaged by the camera 50. The image information 85 includes image information of the surrounding vehicles 2 (including the target vehicle 2t). By performing an image analysis of the image information 85 by a well-known method, it is possible to recognize blinker flashing of the surrounding vehicle 2 (i.e. the target vehicle 2t).

Moreover, the information acquisition unit 71 receives a variety of information through the communication device 60. The information received through the communication device 60 is received information 86. For example, the information acquisition unit 71 receives surrounding vehicle providing information from the surrounding vehicle 2 through the V2V communication. The surrounding vehicle providing information includes a variety of information detected by the surrounding vehicle 2. In addition, the information acquisition unit 71 receives delivery information from the infrastructure through the V2I communication. The delivery information is exemplified by roadwork section information, accident information, traffic jam information, traffic regulation information, and so forth. The received information 86 includes the surrounding vehicle providing information and the delivery information.

All of the position-orientation information 82, the lane information 83, the sensor detected information 84, the image information 85, and the received information 86 as exemplified above indicate a situation around the vehicle 1. Information indicating such the situation around the vehicle 1 is hereinafter referred to as "surrounding situation information 80". That is to say, the surrounding situation information 80 includes the position-orientation information 82, the lane information 83, the sensor detected information 84, the image information 85, and the received information 86.

It can be said that the information acquisition unit 71 of the control device 70 has a function of acquiring the surrounding situation information 80. As shown in FIG. 3, the information acquisition unit 71 together with the GPS receiver 20, the map database 30, the sensor group 40, the camera 50, and the communication device 60 constitute an "information acquisition device 90". The information acquisition device 90 as a part of the blinker judgment device 10 performs the information acquisition processing described above.

2-3. Blinker Judgment Processing

Figure 4:
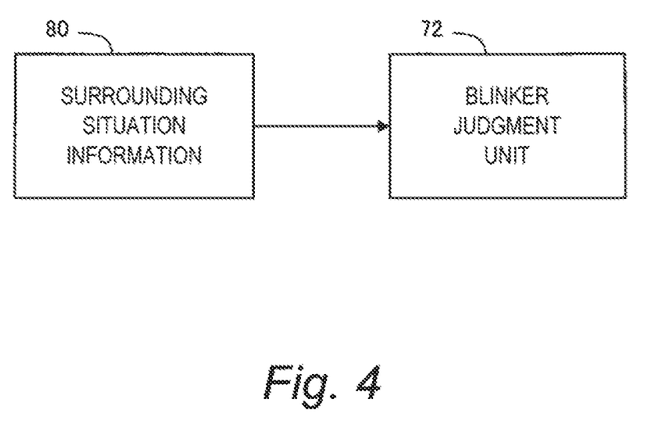
FIG. 4 is a block diagram for explaining functions of a blinker judgment unit of the blinker judgment device according to the embodiment of the present disclosure.
Figure 5:
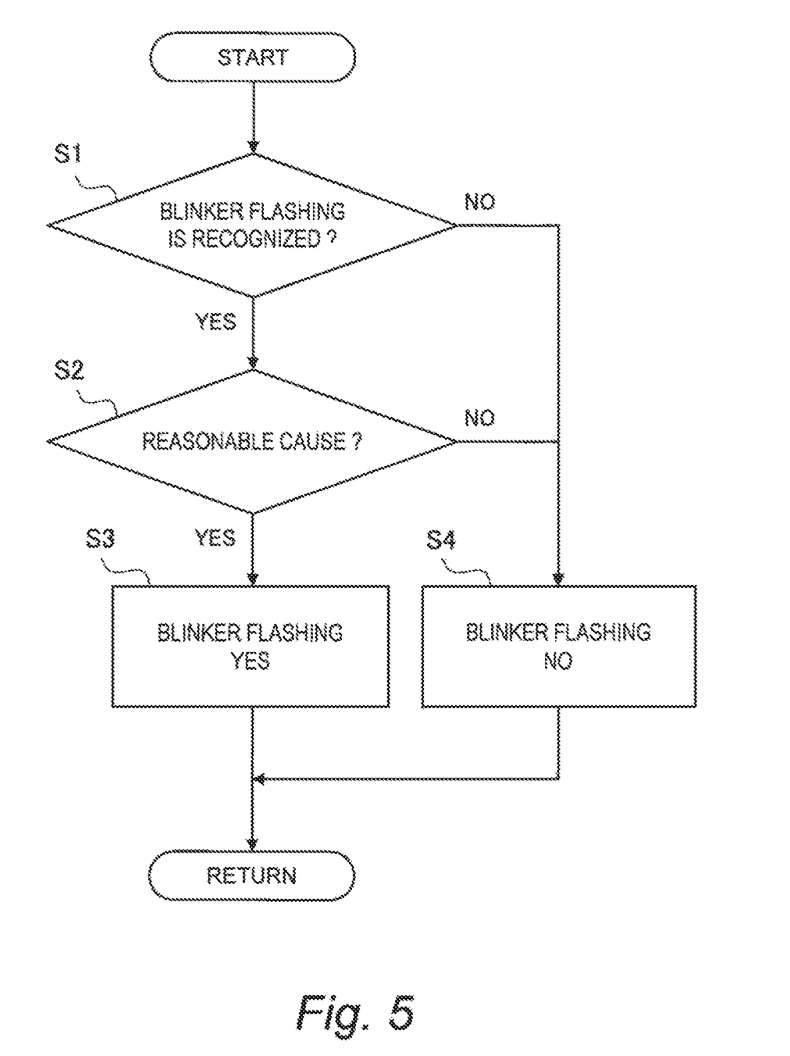
FIG. 5 is a flow chart showing blinker judgment processing by the blinker judgment device according to the embodiment of the present disclosure.

FIG. 4 is a block diagram for explaining functions of the blinker judgment unit 72 of the control device 70. The blinker judgment unit 72 performs the "blinker judgment processing" that judges blinker flashing of the target vehicle 2t based on the above-mentioned surrounding situation information 80. FIG. 5 is a flow chart showing the blinker judgment processing according to the present embodiment.

Step S1:

The blinker judgment unit 72 performs recognition processing for recognizing blinker flashing based on the image information 85 of the target vehicle 2t imaged by the camera 50. More specifically, the blinker judgment unit 72 performs an image analysis of the image information 85 of the target vehicle 2t by a well-known method to determine whether or not the target vehicle 2t is performing blinker flashing. As the well-known method, a method disclosed in Patent Literature 1 or Patent Literature 2 may be used.

When blinker flashing of the target vehicle 2t is recognized by the recognition processing (Step S1; Yes), the processing proceeds to Step S2. On the other hand, when no blinker flashing of the target vehicle 2t is recognized by the recognition processing (Step S1; No), the processing proceeds to Step S4.

Step S2:

The blinker judgment unit 72 performs reasonableness check processing based on the above-described surrounding situation information 80. More specifically, the blinker judgment unit 72 checks whether or not there is any "reasonable cause" for the target vehicle 2t to make a lane change (i.e. blinker flashing). A variety of reasonable causes can be considered. Various examples of the reasonable cause will be described later in detail.

A content of the reasonable cause is predetermined and recorded in the memory of the control device 70. Types of the reasonable cause recorded can be plural. In that case, "there being a reasonable cause" means that there is at least one of the plural types of reasonable causes. Based on the information recorded beforehand in the memory and the surrounding situation information 80, the blinker judgment unit 72 can check whether or not there is any reasonable cause.

In the present Step S2, a direction (left or right) indicated by the blinker flashing may be taken into consideration. For the sake of explanation, a direction indicated by the blinker flashing recognized in the above-described Step S1 is referred to as a "recognized direction". On the other hand, a direction of the lane change expected from the cause of the lane change is referred to as an "expected direction". When the expected direction and the recognized direction are consistent with each other, the cause is reasonable. By considering consistency between the recognized direction and the expected direction in this manner, it is possible to further increase accuracy of the reasonableness check processing in the present Step S2.

Where there is any reasonable cause (Step S2; Yes), the processing proceeds to Step S3. On the other hand, when there is no reasonable cause (Step S2; No), the processing proceeds to Step S4.

Step S3:

The blinker judgment unit 72 judges that the recognition of the blinker flashing in Step S1 is correct. That is, the blinker judgment unit 72 judges that the target vehicle 2t is in a process of the blinker flashing. Then, the blinker judgment unit 72 outputs "blinker flashing: YES" as a judgment result.

Step S4:

The blinker judgment unit 72 judges that the target vehicle 2t is not in a process of the blinker flashing. Then, the blinker judgment unit 72 outputs "blinker flashing: NO" as a judgment result.

2-4. Various Examples of Reasonable Cause

Figure 6:
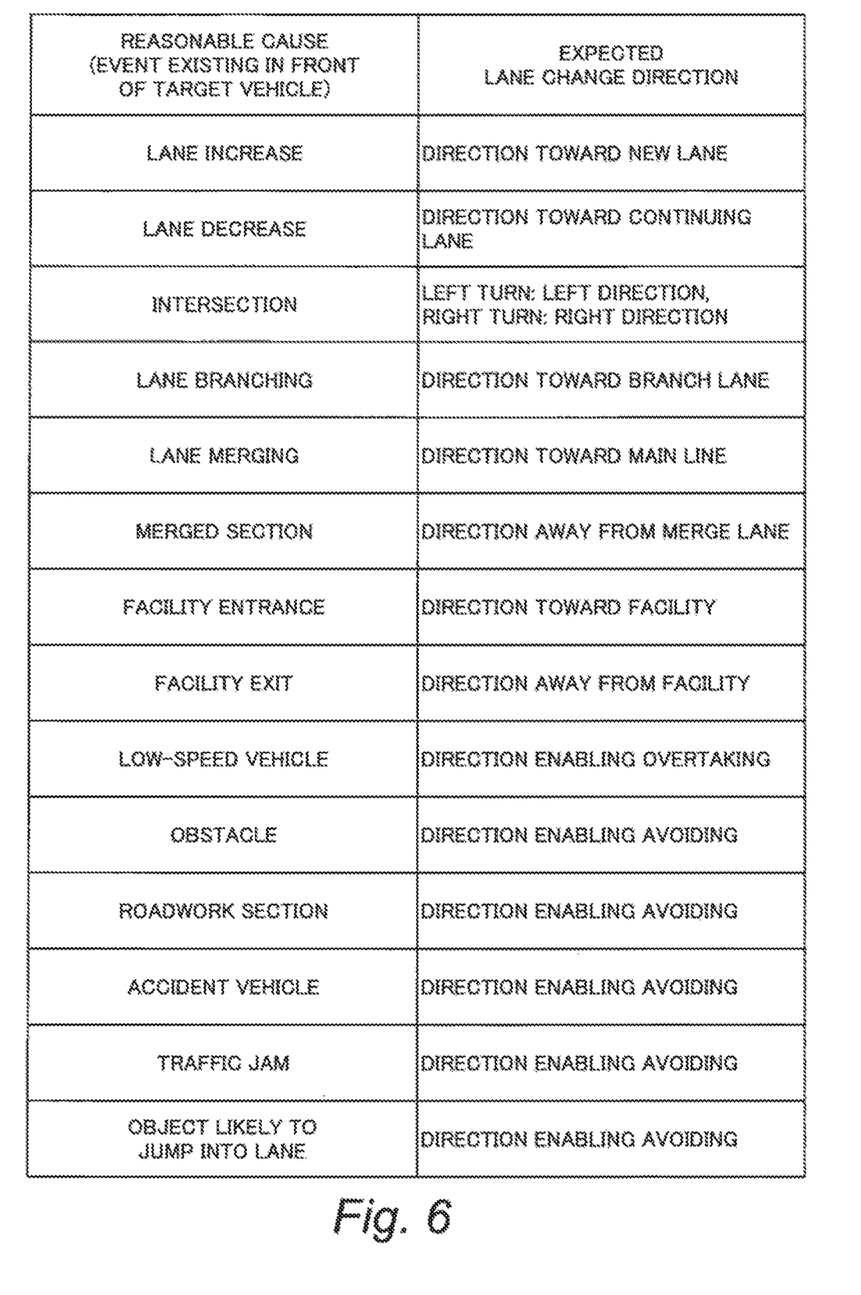
FIG. 6 is a conceptual diagram for explaining examples of a reasonable cause for a target vehicle to make a lane change (blinker flashing)
Figure 7:
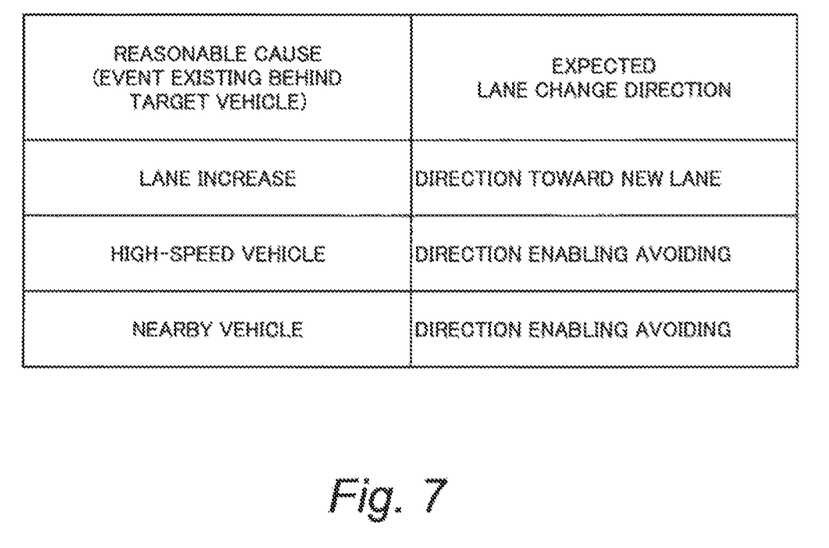
FIG. 7 is a conceptual diagram for explaining other examples of the reasonable cause for the target vehicle to make a lane change (blinker flashing)
Figure 8:
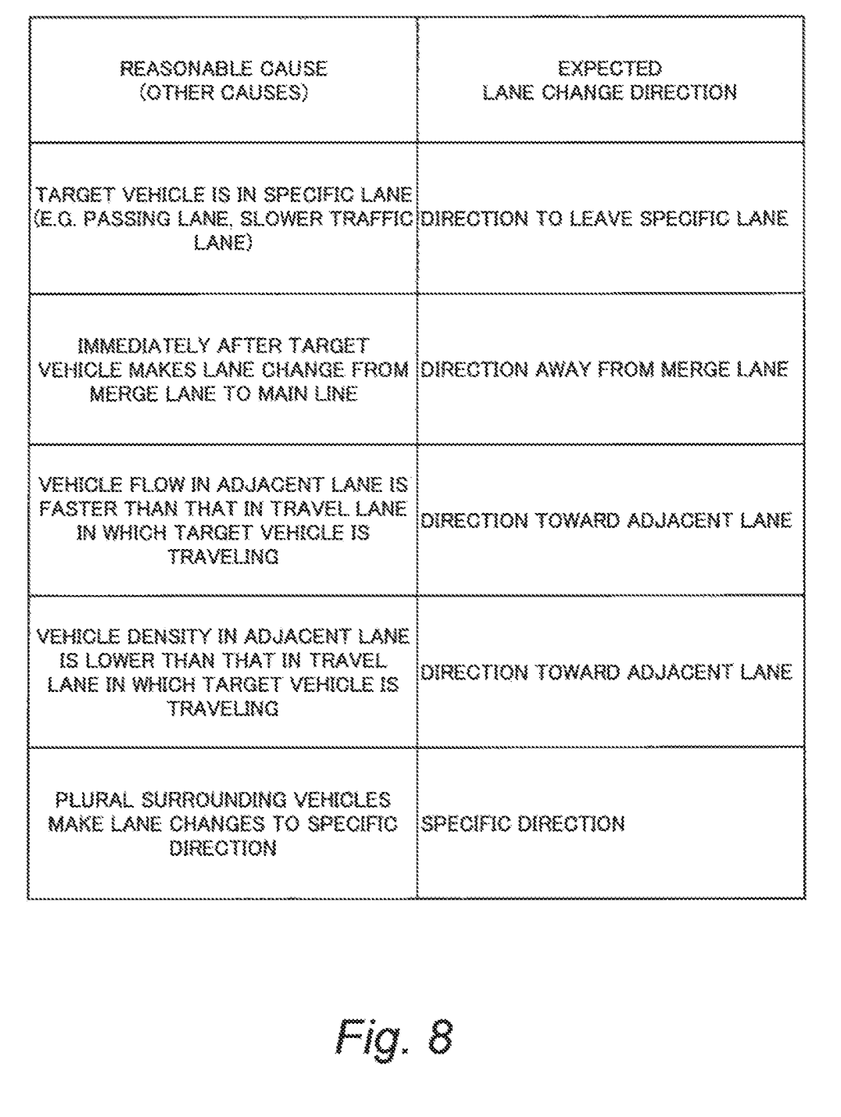
FIG. 8 is a conceptual diagram for explaining still other examples of the reasonable cause for the target vehicle to make a lane change (blinker flashing)

FIGS. 6 to 8 are conceptual diagrams for explaining examples of the reasonable cause for the target vehicle 2t to make a lane change (blinker flashing). Here, the lane change means a vehicle operation in an direction away from a current travel lane. Not only the reasonable cause but also the expected direction (i.e. the direction of the lane change expected from the cause) is shown in each of FIGS. 6 to 8. In the above-described Step S2, consistency between the expected direction and the recognized direction (i.e. the direction indicated by the blinker flashing recognized in Step S1) may be taken into consideration.

A typical example of the reasonable cause is that there is an "event" that causes the target vehicle 2t to make a lane change. FIG. 6 shows various examples of such the event, especially of the event existing in front of the target vehicle 2t. The event existing in front of the target vehicle 2t is hereinafter referred to as a "forward event".

An example of the forward event is "lane increase". For example, when a slower traffic lane starts in front of the target vehicle 2t, the target vehicle 2t may move to the slower traffic lane. Therefore, the lane increase is a reasonable cause. The expected direction in this case is a direction toward a new lane to be added. The lane increase can be detected based on the lane information 83 or the sensor detected information 84 (specifically, results of recognition of traffic signs, white lines, and the like).

Another example of the forward event is "lane decrease". For example, when the target vehicle 2t is traveling in a slower traffic lane and the slower traffic lane ends in front of the target vehicle 2t, the target vehicle 2t is likely to return from the slower traffic lane to a main line. Therefore, the lane decrease is a reasonable cause. The expected direction in this case is a direction toward a continuing lane. The lane decrease can be detected based on the lane information 83 or the sensor detected information 84 (specifically, results of recognition of traffic signs, white lines, and the like).

Still another example of the forward event is an "intersection". The target vehicle 2t may make a right or left turn at the intersection. Therefore, the intersection is a reasonable cause. When the target vehicle 2t is traveling in a left turn lane or the target vehicle 2t approaches a left turn lane, the expected direction is the left direction. On the other hand, when the target vehicle 2t is traveling in a right turn lane or the target vehicle 2t approaches a right turn lane, the expected direction is the right direction. The intersection can be detected based on the lane information 83 or the sensor detected information 84 (specifically, results of recognition of traffic signs, traffic signals, and the like).

Still another example of the forward event is "lane branching". The target vehicle 2t may enter a branch lane ahead. As another example, in order to enter a branch lane ahead, the target vehicle 2t may beforehand make a lane change to a lane adjacent to the branch lane. Therefore, the lane branching is a reasonable cause. The expected direction in this case is a direction toward the branch lane. The lane branching can be detected based on the lane information 83 or the sensor detected information 84 (specifically, results of recognition of traffic signs, white lines, and the like).

Still another example of the forward event is "lane merging". When a lane in which the target vehicle 2t is traveling is a merge lane that merges with a main line ahead, the target vehicle 2t is likely to move to the main line. Therefore, the lane merging is a reasonable cause. The expected direction in this case is a direction toward the main line. The lane merging can be detected based on the lane information 83 or the sensor detected information 84 (specifically, results of recognition of traffic signs, white lines, and the like).

Still another example of the forward event is a "merged section". Let us consider a case where the target vehicle 2t is traveling in a main line and a merge lane merges with the main line in front of the target vehicle 2t. In this case, the target vehicle 2t may make a lane change in a direction away from the merge lane in order to avoid another vehicle from the merge lane. Therefore, the merged section is a reasonable cause. The expected direction in this case is the direction away from the merge lane. The merged section can be detected based on the lane information 83 or the sensor detected information 84 (specifically, results of recognition of traffic signs, white lines, and the like).

Still another example of the forward event is a "facility entrance". The facility is exemplified by a parking lot, a gas station, a convenience store, a shopping center, and so forth. The target vehicle 2t may enter such the facility. Therefore, the facility entrance is a reasonable cause. The expected direction in this case is a direction toward the facility. The facility entrance can be detected based on the lane information 83 (specifically, information on facilities).

Still another example of the forward event is a "facility exit". The facility is exemplified by a parking lot, a gas station, a convenience store, a shopping center, and so forth. The target vehicle 2t may make a lane change in a direction away from the facility in order to avoid another vehicle coming out from the facility. Therefore, the facility exit is a reasonable cause. The expected direction in this case is a direction away from the facility. The facility exit can be detected based on the lane information 83 (specifically, information on facilities).

Still another example of the forward event is a "low-speed vehicle". The low-speed vehicle is another vehicle slower than the target vehicle 2t. The target vehicle 2t may make a lane change in order to overtake the low-speed vehicle. Therefore, the low-speed vehicle is a reasonable cause. The expected direction in this case is a direction enabling the overtaking (typically, a direction toward a passing lane). The low-speed vehicle can be detected based on the sensor detected information 84 (specifically, results of recognition of the surrounding vehicles 2) or the received information 86 (specifically, the surrounding vehicle providing information received from the surrounding vehicles 2).

Still another example of the forward event is an "obstacle". The obstacle here is a concept including not only a fallen object but also a stopped vehicle, a bicycle, pedestrian, and the like. The target vehicle 2t may make a lane change in order to avoid the obstacle. Therefore, the obstacle is a reasonable cause. The expected direction in this case is a direction enabling avoiding the obstacle. The obstacle can be detected based on the sensor detected information 84 (specifically, results of recognition of targets) or the received information 86 (specifically, the surrounding vehicle providing information received from the surrounding vehicles 2).

Still another example of the forward event is a "roadwork section". The target vehicle 2t may make a lane change in order to avoid the roadwork section. Therefore, the roadwork section is a reasonable cause. The expected direction in this case is a direction enabling avoiding the roadwork section. The roadwork section can be detected based on the received information 86 (specifically, the roadwork section information) or the image information 85.

Still another example of the forward event is an "accident vehicle". The target vehicle 2t may make a lane change in order to avoid the accident vehicle. Therefore, the accident vehicle is a reasonable cause. The expected direction in this case is a direction enabling avoiding the accident vehicle. The accident vehicle can be detected based on the received information 86 (specifically, the accident information) or the image information 85.

Still another example of the forward event is a "traffic jam". The target vehicle 2t may make a lane change in order to avoid the traffic jam. Therefore, the traffic jam is a reasonable cause. The expected direction in this case is a direction enabling avoiding the traffic jam. The traffic jam can be detected based on the received information 86 (specifically, the traffic jam information) or the sensor detected information 84 (specifically, results of recognition of the surrounding vehicles 2).

Still another example of the forward event is an "object likely to jump into a lane". The target vehicle 2t may make a lane change in order to avoid such the object. Therefore, the object likely to jump into a lane is a reasonable cause. The expected direction in this case is a direction enabling avoiding the object. The object likely to jump into a lane can be detected based on the sensor detected information 84 (specifically, results of recognition of targets).

FIG. 7 shows examples of the event existing behind the target vehicle 2t. The event existing behind the target vehicle 2t is hereinafter referred to as a "rearward event".

An example of the rearward event is "lane increase". For example, a driver of the target vehicle 2t may decide to move to a slower traffic lane after the slower traffic lane starts. Therefore, the lane increase is a reasonable cause. The expected direction in this case is a direction toward an added new lane. The lane increase can be detected based on the lane information 83 or the sensor detected information 84 (specifically, results of recognition of traffic signs, white lines, and the like).

Another example of the rearward event is a "high-speed vehicle". The high-speed vehicle is another vehicle faster than the target vehicle 2t. An emergency vehicle also is included in the high-speed vehicle. The target vehicle 2t may make a lane change in order to avoid the high-speed vehicle, namely, to make way for the high-speed vehicle. Therefore, the high-speed vehicle is a reasonable cause. The expected direction in this case is a direction enabling avoiding the high-speed vehicle. The high-speed vehicle can be detected based on the sensor detected information 84 (specifically, results of recognition of the surrounding vehicles 2) or the received information 86 (specifically, the surrounding vehicle providing information received from the surrounding vehicles 2).

Still another example of the rearward event is a "nearby vehicle". The nearby vehicle is another vehicle whose distance to the target vehicle 2t is equal to or less than a threshold value. The target vehicle 2t may make a lane change in order to avoid the nearby vehicle, namely, to make way for the nearby vehicle. Therefore, the nearby vehicle is a reasonable cause. The expected direction in this case is a direction enabling avoiding the nearby vehicle. The nearby vehicle can be detected based on the sensor detected information 84 (specifically, results of recognition of the surrounding vehicles 2) or the received information 86 (specifically, the surrounding vehicle providing information received from the surrounding vehicles 2).

The reasonable cause is not limited to existence of the event as described above. FIG. 8 shows still other examples of the reasonable cause.

Still another example of the reasonable cause is that the target vehicle 2t is in a specific lane. The specific lane is a lane different from a usual travel lane. The specific lane is exemplified by a passing lane, a slower traffic lane, and so forth. The target vehicle 2t in the specific lane may return back to the usual travel lane. Therefore, the present cause is reasonable. The expected direction in this case is a direction to leave the specific lane. The present cause can be detected based on the lane information 83 or the sensor detected information 84 (specifically, results of recognition of traffic signs, white lines, and the like).

Still another example of the reasonable cause is that it is immediately after the target vehicle 2t makes a lane change from a merge lane to a main line. Such the target vehicle 2t may further make a lane change within the main line. Therefore, the present cause is reasonable. The expected direction in this case is a direction away from the merge lane. The present cause can be detected based on the lane information 83 and the sensor detected information 84 (specifically, results of recognition of the target vehicle 2t).

Still another example of the reasonable cause relates to a state of an adjacent lane. For the sake of explanation, a lane in which the target vehicle 2t is traveling is referred to as a "first lane", and a lane adjacent to the first lane is referred to as a "second lane". The present reasonable cause is that a vehicle (traffic) flow in the second lane is faster than that in the first lane. In this case, the target vehicle 2t may move to the second lane in which the flow is faster. Therefore, the present cause is reasonable. The expected direction in this case is a direction toward the second lane. The flow speed can be calculated based on respective speeds of the surrounding vehicles 2. Therefore, the present cause can be detected based on the lane information 83 and the sensor detected information 84 (specifically, results of recognition of the surrounding vehicles 2).

Still another example of the reasonable cause is that a vehicle density in the second lane is lower than that in the first lane. In this case, the target vehicle 2t may move to the second lane being less crowded. Therefore, the present cause is reasonable. The expected direction in this case is a direction toward the second lane. The vehicle density can be calculated based on respective positions of the surrounding vehicles 2. Therefore, the present cause can be detected based on the lane information 83 and the sensor detected information 84 (specifically, results of recognition of the surrounding vehicles 2).

Still another example of the reasonable cause is that a plurality of surrounding vehicles 2 make lane changes to the same specific direction in the vicinity of the target vehicle 2t. In this case, it is highly probable that the target vehicle 2t also makes a lane change to the same specific direction. Therefore, the present cause is reasonable. The expected direction in this case is the specific direction. The present cause can be detected based on results of the blinker judgement with regard to the plurality of surrounding vehicles 2 by the blinker judgment device 10. Alternatively, the present cause can be detected based on the sensor detected information 84 (specifically, results of recognition of motions of the surrounding vehicles 2). Alternatively, when there is an external system that records driving operations of a large number of vehicles and delivers information on the driving operations, the present cause can be detected based on the received information 86 (specifically, the delivery information from the external system).

In the present embodiment, at least one of the reasonable causes as exemplified above is used. Plural types of causes may be used. In that case, there being a reasonable cause means that there is at least one of the plural types of causes.

2-5. Effects

As described above, the blinker judgment device 10 according to the present embodiment recognizes the blinker flashing of the target vehicle 2t based on the image information 85 imaged by the camera 50. Furthermore, the blinker judgment device 10 checks, based on the surrounding situation information 80, whether or not there is any reasonable cause for the target vehicle 2t to make a lane change. Only in the case where the reasonable cause exists, the blinker judgment device 10 judges that the target vehicle 2t is in a process of the blinker flashing. Accordingly, the possibility that the blinker is erroneously recognized to be flashing although the blinker is not flashing in reality decreases. In other words, it is possible to judge the blinker flashing of the target vehicle 2t with higher accuracy. As a result, the driver's confidence in the blinker judgment device 10 increases.

3. Autonomous Driving System

Figure 9:
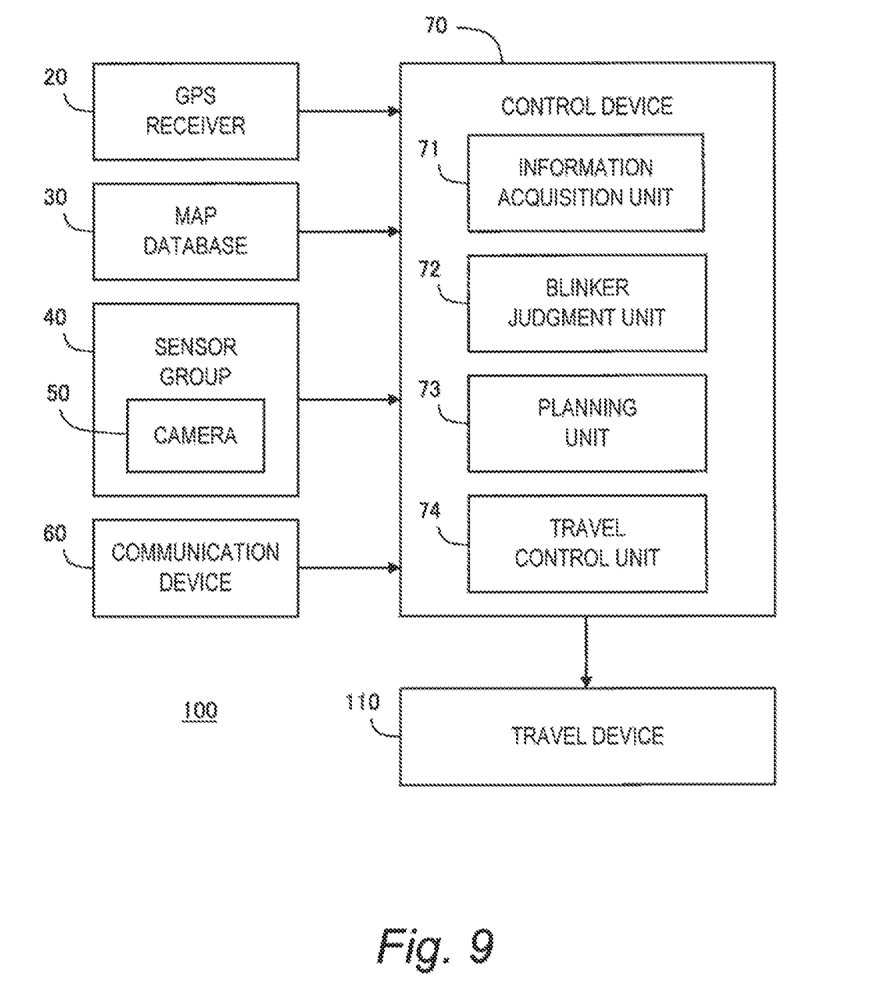
FIG. 9 is a block diagram showing a configuration example of an autonomous driving system provided with the blinker judgment device according to the embodiment of the present disclosure.

FIG. 9 is a block diagram showing a configuration example of an autonomous driving system 100 provided with the blinker judgment device 10 according to the present embodiment. The autonomous driving system 100 is mounted on the vehicle 1 and controls autonomous driving of the vehicle 1.

More specifically, the autonomous driving system 100 is provided with a travel device 110 in addition to the configuration of the blinker judgment device 10 shown in the foregoing FIG. 2. The travel device 110 includes a steering device, a driving device, a braking device, a transmission, and so forth. The steering device turns wheels. The driving device is a power source that generates a driving force. The driving device is exemplified by an engine and an electric motor. The braking device generates a braking force.

Moreover, the control device 70 controls the autonomous driving of the vehicle 1. For that purpose, the control device 70 further includes a planning unit 73 and a travel control unit 74 in addition to the information acquisition unit 71 and the blinker judgment unit 72. These functional blocks are achieved by the processor of the control device 70 executing a control program stored in the memory.

The planning unit 73 devises, based on the surrounding situation information 80, a travel plan of the vehicle 1 in the autonomous driving. For example, the planning unit 73 determines, based on the position-orientation information 82 (the current position) and the lane information 83, a travel plan including a travel route, a lane change point, and the like. As another example, the planning unit 73 monitors, based on the sensor detected information 84, a relative distance and a relative speed with respect to a preceding vehicle in front of the vehicle 1. Then, the planning unit 73 devises a travel plan including an avoidance behavior for avoiding collision with the preceding vehicle. The avoidance behavior here is deceleration or a lane change.

The travel control unit 74 controls the travel device 110 such that the vehicle 1 travels according to the travel plan. The controls of the travel device 110 include steering control for controlling the steering device, acceleration control for controlling the driving device, and deceleration control for controlling the braking device.

As an example, let us consider here the situation shown in FIG. 1. In FIG. 1, the vehicle 1 is traveling in the lane L1, and the target vehicle 2t is traveling in the lane L2 adjacent to the right side of the lane L1. The target vehicle 2t flashes a blinker indicating the left direction. The blinker judgment device 10 according to the present embodiment judges the blinker flashing of the target vehicle 2t with high accuracy. Then, the planning unit 73 predicts a behavior of the target vehicle 2t based on the result of judgment by the blinker judgment device 10. More specifically, the planning unit 73 predicts, from the blinker flashing indicating the left direction, that the target vehicle 2t will make a lane change from the lane L2 to the lane L1, namely, the target vehicle 2t will cut in front of the vehicle 1. Therefore, the planning unit 73 plans to decelerate the vehicle 1 in order to avoid collision with the target vehicle 2t. Then, the travel control unit 74 performs the deceleration control to decelerate the vehicle 1.

As a comparative example, let us consider a case where the planning unit 73 predicts the behavior of the target vehicle 2t based only on the result of recognition of blinker flashing based on the image analysis of the image information 85. Accuracy of the recognition of blinker flashing based on the image analysis of the image information 85 is not always high. Therefore, there is a possibility that a blinker is erroneously recognized to be flashing although the blinker is not flashing in reality. If such the erroneous (false) recognition occurs, the planning unit 73 plans unnecessary deceleration of the vehicle 1. Then, the travel control unit 74 performs unnecessary deceleration control. The driver feels senses of strangeness and distrust with respect to such the unnecessary deceleration control.

On the other hand, the autonomous driving system 100 according to the present embodiment predicts the behavior of the target vehicle 2t based on the highly-accurate result of judgment by the blinker judgment device 10 to control the autonomous driving of the vehicle 1. It is thus possible to achieve more safe and highly accurate autonomous driving. This contributes to increase in confidence in the autonomous driving system 100.

What is claimed is:

1. A blinker judgment device mounted on a vehicle, comprising:
   an information acquisition device configured to acquire surrounding situation information indicating a situation around the vehicle; and
   a control device configured to:
   recognize blinker flashing of a target vehicle based on image information of the target vehicle;
   check, based on the surrounding situation information, whether or not there is a cause for the target vehicle to make a lane change, in response to recognition of the blinker flashing based on the image information;
   judge that the recognition of the blinker flashing based on the image information is falsely positive in response to determining that the cause does not exist; and
   devise a travel plan based on the recognition of the blinker flashing in response to determining that the cause exists.

2. The blinker judgment device according to claim 1, wherein the travel plan includes an avoidance behavior for avoiding collision with the target vehicle.

3. The blinker judgment device according to claim 1, wherein the travel plan includes decelerating the vehicle.

4. The blinker judgment device according to claim 1, wherein a direction of the lane change expected from the cause is consistent with a direction indicated by the blinker flashing recognized by the recognition processing.

5. The blinker judgment device according to claim 1, wherein the cause is an event that exists in front of or behind the target vehicle.

6. The blinker judgment device according to claim 5, wherein the event existing in front of the target vehicle includes at least one of lane increase, lane decrease, an intersection, lane branching, lane merging, a facility entrance, a facility exit, a low-speed vehicle slower than the target vehicle, an obstacle, a roadwork section, an accident vehicle, and a traffic jam.

7. The blinker judgment device according to claim 5, wherein the event existing behind the target vehicle includes at least one of lane increase, a high-speed vehicle faster than the target vehicle, and a nearby vehicle whose distance to the target vehicle is equal to or less than a threshold value.

8. The blinker judgment device according to claim 1, wherein the cause is that the target vehicle is in a passing lane or a slower traffic lane.

9. The blinker judgment device according to claim 1, wherein the target vehicle travels in a first lane,
   a second lane is adjacent to the first lane, and
   the cause is that a vehicle flow in the second lane is faster than that in the first lane or a vehicle density in the second lane is lower than that in the first lane.

10. An autonomous driving system comprising:
    a blinker judgment device mounted on a vehicle, comprising:
    an information acquisition device configured to acquire surrounding situation information indicating a situation around the vehicle; and
    a control device configured to:
    recognize blinker flashing of a target vehicle based on image information of the target vehicle;
    check, based on the surrounding situation information, whether or not there is a cause for the target vehicle to make a lane change, in response to recognition of the blinker flashing based on the image information;
    judge that the recognition of the blinker flashing based on the image information is falsely positive in response to the reasonableness check processing determining that the cause does not exist; and
    devise a travel plan based on the recognition of the blinker flashing in response to determining that the cause exists.

11. The autonomous driving system according to claim 10, wherein the travel plan includes an avoidance behavior for avoiding collision with the target vehicle.

12. The autonomous driving system according to claim 10, wherein the travel plan includes decelerating the vehicle.

13. The autonomous driving system according to claim 10, wherein a direction of the lane change expected from the cause is consistent with a direction indicated by the blinker flashing recognized by the recognition processing.

14. The autonomous driving system according to claim 10, wherein the cause is an event that exists in front of or behind the target vehicle.

15. The autonomous driving system according to claim 14, wherein the event existing in front of the target vehicle includes at least one of lane increase, lane decrease, an intersection, lane branching, lane merging, a facility entrance, a facility exit, a low-speed vehicle slower than the target vehicle, an obstacle, a roadwork section, an accident vehicle, and a traffic jam.

16. The autonomous driving system according to claim 14, wherein the event existing behind the target vehicle includes at least one of lane increase, a high-speed vehicle faster than the target vehicle, and a nearby vehicle whose distance to the target vehicle is equal to or less than a threshold value.

17. The autonomous driving system according to claim 10, wherein the cause is that the target vehicle is in a passing lane or a slower traffic lane.

18. The autonomous driving system according to claim 10, wherein the target vehicle travels in a first lane,
    a second lane is adjacent to the first lane, and
    the cause is that a vehicle flow in the second lane is faster than that in the first lane or a vehicle density in the second lane is lower than that in the first lane.

* * * * *